(12) United States Patent
Tsuda et al.

(10) Patent No.: US 6,262,783 B1
(45) Date of Patent: Jul. 17, 2001

(54) LIQUID CRYSTAL DISPLAY DEVICE WITH REFLECTIVE ELECTRODES AND METHOD FOR FABRICATING THE SAME

(75) Inventors: Kazuhiko Tsuda, Tenri; Mariko Ban, Nara; Tomoko Tanaka, Tenri, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/038,987

(22) Filed: Mar. 12, 1998

(30) Foreign Application Priority Data

Mar. 12, 1997 (JP) .................................................. 9-057236
Dec. 25, 1997 (JP) .................................................. 9-356485

(51) Int. Cl.⁷ ................................................ G02F 1/1345
(52) U.S. Cl. ............................ 349/39; 349/111; 349/113
(58) Field of Search ........................... 349/38, 111, 113, 349/39, 110; 438/30

(56) References Cited

U.S. PATENT DOCUMENTS

| | | | | |
|---|---|---|---|---|
| 4,456,336 | * | 6/1984 | Chung et al. ........................ | 350/338 |
| 4,519,678 | * | 5/1985 | Komatsubara et al. ............. | 349/113 |
| 5,042,916 | * | 8/1991 | Ukai et al. ............................ | 359/59 |
| 5,204,765 | * | 4/1993 | Mitsui et al. ......................... | 359/70 |
| 5,408,345 | * | 4/1995 | Mitsui et al. ......................... | 359/59 |
| 5,418,635 | | 5/1995 | Mitsui et al. . | |
| 5,526,149 | * | 6/1996 | Kanbe et al. ......................... | 359/70 |
| 5,610,741 | * | 3/1997 | Kimura ................................. | 349/113 |
| 5,684,551 | * | 11/1997 | Nakamura et al. ................... | 349/99 |
| 5,691,791 | * | 11/1997 | Nakamura et al. ................... | 349/113 |
| 5,796,455 | * | 8/1998 | Mizobata et al. .................... | 349/116 |
| 5,805,252 | * | 9/1998 | Shimada et al. ..................... | 349/113 |
| 5,886,365 | * | 3/1999 | Kouchi et al. ....................... | 349/151 |
| 6,018,377 | * | 9/1998 | Kim ...................................... | 349/38 |

FOREIGN PATENT DOCUMENTS 6-27481 A   2/1994 (JP) .
9-101510A   4/1997 (JP) .

* cited by examiner

Primary Examiner—Kenneth Parker
(74) Attorney, Agent, or Firm—Nixon & Vanderhye P.C.

(57) ABSTRACT

A reflective liquid crystal display device includes a pair of transparent plates, a liquid crystal layer interposed between the pair of plates, and a light-shielding layer provided on one of the plates. The light-shielding layer has a light-transmitting portion and a light-shielding portion. The reflective liquid crystal display device further includes a storage capacitor electrode and an insulating layer covering the light-shielding layer and the storage capacitor electrode. The insulating layer has concave and convex surfaces. The reflective liquid crystal display device further includes a reflective pixel electrode provided on the concave and convex surfaces of the insulating layer.

12 Claims, 13 Drawing Sheets

Exposure

Exposure

LIQUID CRYSTAL DISPLAY DEVICE WITH REFLECTIVE ELECTRODES AND METHOD FOR FABRICATING THE SAME

BACKGROUND OF THE INVENTION

1. Field of the Invention

The present invention relates to a reflective liquid crystal display device preferably used as display means for an information terminal device such as a personal computer, a mobile computer, and a word processor, as well as a portable telephone, an electronic still camera, a VTR, a car navigating device, a liquid crystal television, or the like; and a method for fabricating the same.

2. Description of the Related Art

In recent years, reflective liquid crystal display devices have been widely used, especially as information display means for a portable information terminal device, because the reflective liquid crystal display device can be made thin and light-weight and it consumes low electricity.

In such a reflective liquid crystal display device, the development of a diffuse reflection plate has been vigorously conducted in order to realize a paper white display. For example, Japanese Laid-open Publication No. 6-27481 describes the technique for a diffuse reflection plate employing a photosensitive resin.

According to the above-described Publication, when concave and convex portions are patterned using a photosensitive resin, exposure is performed using a stepper exposure device with a photomask. However, in the case where the stepper exposure device is employed, an area which can be exposed at one time is limited to approximately a 5 inch sized area. As a result, in the case where an area greater than a 5 inch area is exposed, it is necessary to change exposure sites more than once so as to cover entire area to be exposed.

When more than one exposure is conducted during the fabrication process of a diffuse reflection plate with an area greater than 5 inches, for example, it is necessary to perform delicate alignment work with a mask, a substrate, and a stepper for every exposure, resulting in a significantly degraded working efficiency. Even if the alignment is accurately performed, due to a natural light-quantity distribution in the stepper or distortion in light rays (i.e., differences in the degree of light parallelization, or the like), exposure conditions differ for every region bounded by a joint (i.e., a boundary of a region exposed at one time). As a result, the shape of unevenness (concave and convex) suddenly changes at the joint area, thereby influencing optical characteristics of the reflective electrode. Consequently, joint or non-uniformity in display is observed.

SUMMARY OF THE INVENTION

According to one aspect of the invention, a reflective liquid crystal display device includes a pair of transparent plates; a liquid crystal layer interposed between the pair of plates; a light-shielding layer provided on one of the plates, the light-shielding layer having a light-transmitting portion and a light-shielding portion; a storage capacitor electrode; an insulating layer covering the light-shielding layer and the storage capacitor electrode, the insulating layer having concave and convex surfaces; and a reflective pixel electrode provided on the concave and convex surfaces of the insulating layer.

In one embodiment of the invention, the light-shielding layer has a common signal line; the storage capacitor electrode overlaps the common signal line via an insulating layer interposed therebetween so as to form a storage capacitor.

In another embodiment of the invention, the reflective liquid crystal display device further includes a plurality of pixel regions arranged in a matrix of N rows and M columns, where N and M are positive integers; a plurality of capacitor electrodes, each of which correspond to respective pixel region; and N gate signal lines, each of which correspond to a respective row of pixel regions. A storage capacitor electrode in Ith row overlaps an (I+1)th or (I−1)th gate signal lines with an insulating layer interposed therebetween so as to form a storage capacitor, where I is a integer greater than 0 and less than and equal to N.

In another embodiment of the invention, a part of the Ith gate signal line extends into a pixel region so as to overlap the storage capacitor electrodes in the (I+1)th or (I−1)th row with the insulating layer interposed therebetween.

In another embodiment of the invention, the storage capacitor electrode has an opening at a position corresponding to the light-transmitting portion of the light-shielding layer.

In another embodiment of the invention, a shape of the light-transmitting portion of the light-shielding layer is approximately round. A distance between two adjacent light-transmitting portions is in a range of about 3 to about 50 microns.

In another embodiment of the invention, the storage capacitor electrode is a transparent electrode.

According to another aspect of the invention, a method for fabricating a reflective liquid crystal display device including a liquid crystal layer interposed between two substrates, includes the steps of forming a light-shielding layer having a light-transmitting portion on a plate of one of the two substrates; forming a storage capacitor electrode made of a conductive material; forming an insulating layer covering the light-shielding layer and the storage capacitor electrode; and exposing the substrate from a side opposite to the side where the insulating layer is formed.

In one embodiment of the invention, the storage capacitor electrode is a transparent electrode.

Hereinafter, effects of the above-described structures according to the present invention will be described.

According to the reflective liquid crystal display device of the present invention, when the insulating layer having holes is patterned, it becomes possible to realize self-alignment by performing exposure from the bottom side of the substrate with the light-shielding region below the insulating layer used as a mask pattern. Accordingly, no photomask is required, and full plate exposure by a large exposure device becomes possible. As a result, joints and non-uniformity in display, both of which are caused by the stepper exposure, can be overcome. In addition, since the storage capacitor electrode is provided, a storage capacitor for driving a liquid crystal molecule can be formed. As a result, the reflective liquid crystal display device having a satisfactory display quality is obtained.

According to the reflective liquid crystal display device of the present invention, the concave and convex portions on the surface of the reflective electrode are formed by self-alignment due to the bottom-side exposure utilizing the common signal line for forming a storage capacitor. As a result, it becomes possible to provide, with a simple process, the reflective liquid crystal display device generating neither joints nor non-uniformity in display and having excellent display quality which is realized by the storage capacitor.

According to the reflective liquid crystal display device of the present invention, the storage capacitor electrode formed above the light-shielding film overlaps the gate signal line. As a result, the storage capacitor can be easily formed.

According to the reflective liquid crystal display device of the present invention, the gate signal line is overlapped with the storage capacitor electrode so as to form the storage capacitor at a position between an overlapped portion of the extended gate signal line and the storage capacitor electrode and the storage capacitor electrode. As a result, the storage capacitor can be formed without providing the common electrode line.

According to the reflective liquid crystal display device of the present invention, the holes in the light-shielding film are disposed so as to approximately correspond to holes in the storage capacitor electrode. As a result, it becomes possible to form concave and convex portions for giving excellent light scattering characteristics to the surface of the pixel electrode located above the holes. In the case where a reflective liquid crystal display device does not have such a structure, the following defects may occur. For example, when exposure is conducted from the bottom side of substrate upon the patterning of an insulating layer in the case where there is a portion in which a storage capacitor electrode having a light-shielding function or low light-transmittance overlaps holes in a light-shielding film, the storage capacitor electrode covering the holes in the light-shielding film functions as a mask, and thus a region of the insulating layer corresponding to the overlapped portion cannot be patterned completely. As a result, light incident upon this portion is more likely to generate interference due to adhesion between a concave portion and a convex portion adjacent to each other or the like. Consequently, non-uniformity in display or the like occurs. According to the present invention, such degradation in display quality can be avoided.

According to the reflective liquid crystal display device of the present invention, the light-shielding film functions as a signal line even if holes are contained therein. Moreover, by forming cylindrical concave portions, resin accumulates at the bottom of the cylinders. As a result, no adhesion between a concave portion and a convex portion occurs, thereby preventing the generation of a flat area. As a result, incident light is more likely to be scattered.

According to the method for fabricating a reflective liquid crystal display device of the present invention, when the concave and convex patterns are formed on the surface of the insulating layer, it becomes possible to realize self-alignment by performing exposure from the bottom side of the substrate, with the light-shielding region below the insulating layer used as a mask pattern. Accordingly, no photomask is required, and full plate exposure by a large exposure device becomes possible. As a result, joints and non-uniformity in display, both of which are caused by the stepper exposure, can be overcome.

In addition, it becomes possible to easily form the structure for forming a storage capacitor. As a result, the reflective liquid crystal display device having an excellent display quality is obtained.

Thus, the invention described herein makes possible the advantage of providing a reflective liquid crystal display device in which no photomask is required, and full plate exposure by a large exposure device is possible, thereby eliminating joints or non-uniformity in display, both of which are caused by the stepper exposure; and the storage capacitor electrode is provided so as to form a storage capacitor for driving a liquid crystal molecule, thereby obtaining a satisfactory display quality.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative, but non-limiting examples, with reference to the accompanying drawings.

EXAMPLE 1

Hereinafter, a reflective liquid crystal display device according to one example of the present invention will be described.

Figure 1:
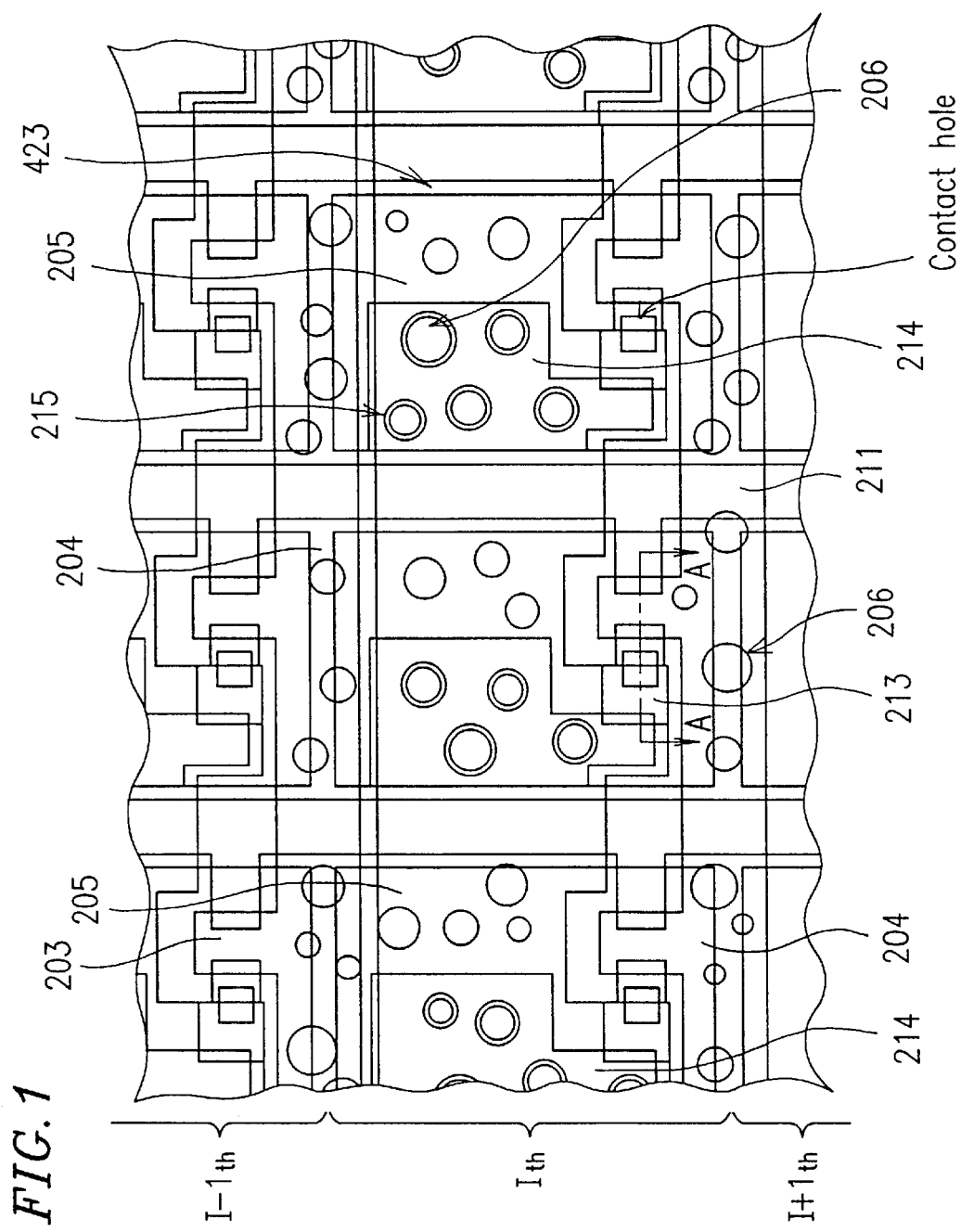
FIG. 1 is a plan view illustrating a portion of a reflective electrode side substrate in a reflective liquid crystal display device according to Example 1 of the present invention.
Figure 2:
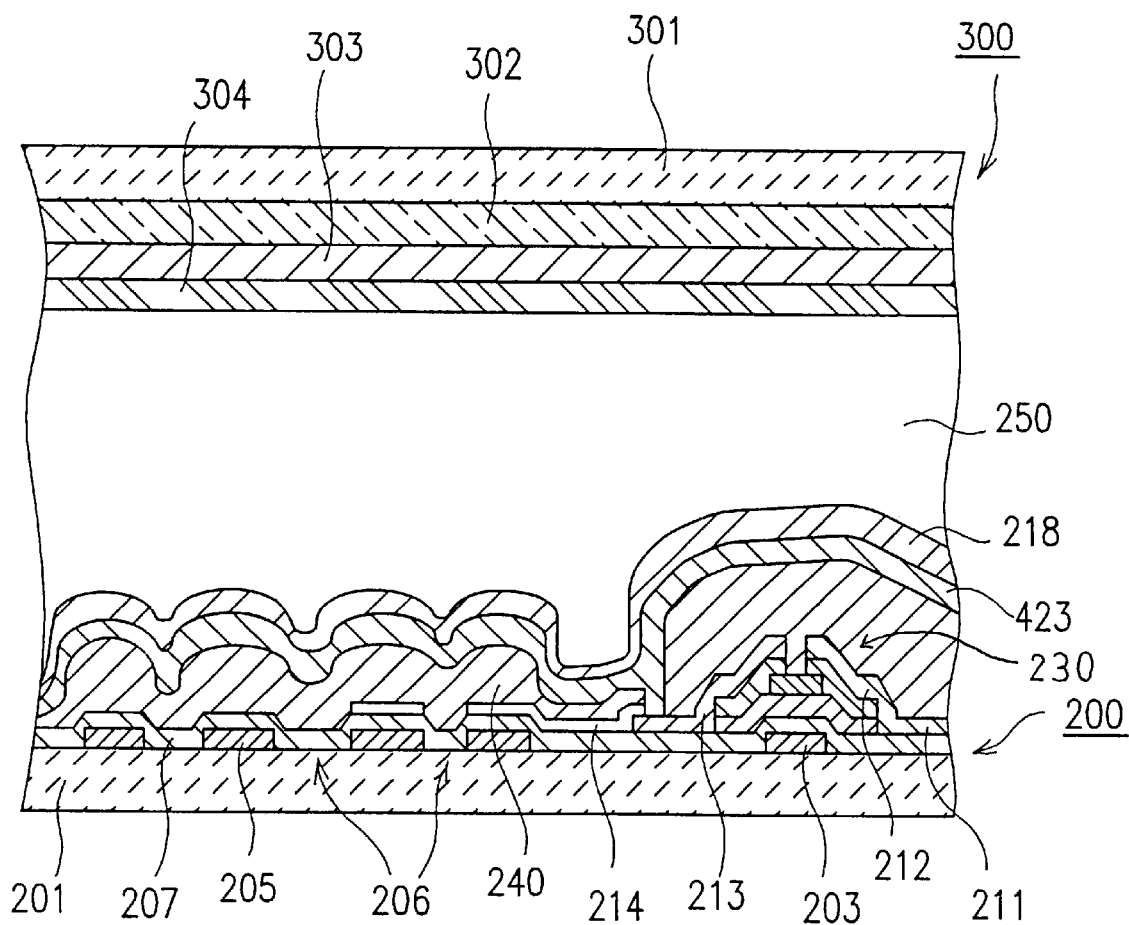
FIG. 2 is a cross-sectional view illustrating the structure of one pixel region of the reflective liquid crystal display device according to Example 1 of the present invention.

First, the structure of the reflective liquid crystal display device according to Example 1 of this invention will be described. FIG. 1 is a plan view illustrating a portion of a reflective electrode side substrate in the reflective liquid crystal display device according to Example 1. FIG. 2 is a cross-sectional view illustrating the structure of one pixel region in the reflective liquid crystal display device taken along line A—A in FIG. 1.

In FIGS. 1 and 2, the reflective liquid crystal display device includes: a reflective electrode side substrate 200; a color filter side substrate 300; and a liquid crystal layer 250 interposed therebetween.

As shown in FIG. 1, a plurality of pixel regions are arranged in a matrix of N rows and M columns in the reflective liquid crystal display device, where N and M are positive integers. In the Examples, one pixel region refers to a region corresponding to an area defined by a pixel electrode 423. The reflective electrode side substrate 200 includes a plurality of storage capacitor electrodes 214, each of which corresponds to a respective pixel region; and N gate signal lines 204, each of which corresponds to a respective row of pixel regions.

More specifically, in one pixel region, the reflective electrode side substrate 200 includes: a plate 201; a gate signal line 204 and a source signal line 211 provided on the plate 201; a TFT 230 provided at the intersection between the gate signal line 204 and the source signal line 211; an insulating layer 240 covering at least a portion of the signal lines 204 and 211 and the TFT 230; a pixel electrode 423 connected to a drain electrode 213 of the TFT 230 via a contact hole provided in the insulating layer 240; a common electrode line 205 which is made of a light-shielding material; a storage capacitor electrode 214; and an alignment film 218. According to Example 1 of the present invention, a signal having the same potential as that in a counter electrode 303 provided in the color filter side substrate is supplied to the common electrode line 205. The common electrode line 205 and the storage capacitor electrode 214 function as electrodes for forming a storage capacitor at the time of driving a liquid crystal. Moreover, the pixel electrode 423 is a reflective electrode formed of a material with a light reflecting function. The above-described TFT 230 includes: a gate electrode 203; a gate insulating film 207; a semiconductor layer 208 (FIG. 3); an n-type semiconductor layer 210 (FIG. 3); a source electrode 212; and a drain electrode 213.

The above-described color filter side substrate 300 includes: a plate 301; a color filter 302; the counter electrode 303; and an alignment film 304.

In Example 1, a guest-host liquid crystal material containing black pigment is employed as the liquid crystal layer 250.

In the reflective liquid crystal display device of Example 1, a plurality of round holes (openings) 206 which transmit light therethrough are disposed at random in the gate signal line 204 and the common electrode line 205. On the surfaces of the insulating layer 240 and the pixel electrode 423 which are formed above the holes 206, there are concave portions corresponding to the shapes of the holes 206. Light incident from outside of the liquid crystal display device upon such unevenness on the surface of the pixel electrode 423 having a light reflecting function is scattered, thereby realizing a paper white display.

According to Example 1 of the present invention, each of the gate signal line 204 and the common electrode line 205 is provided so as to overlap the pixel electrode 423 via the insulating layer 240 interposed therebetween. Even with such a structure, however, since a period of time during which voltage is applied to the gate signal line 204 is sufficiently short, an influence to the display due to capacitive coupling is negligible. Although the pixel electrode 423 overlaps both of the two adjacent gate signal lines, one corresponding to the Ith row of pixel regions including the said pixel electrode 423 and the other corresponding to the (I+1)th or (I−1)th row of the pixel regions in the present example, the present invention is not limited to such a structure. In the case where desired display quality or the desired accuracy of the patterning of the gate signal line 204 and the pixel electrode 423 is not obtained, the pixel electrode 423 may overlap only the gate signal line which corresponds to (I+1)th or (I−1)th row of pixel regions. Alternatively, the pixel electrode 423 may overlap none of those gate signal lines. For example, in the case where an undesirable amount of parasitic capacitance is generated due to an insufficient thickness of the insulating layer interposed therebetween, resulting in a considerable degradation in display quality, it is desirable that the pixel electrode 423 does not overlap at least the gate signal line corresponding to (I+1)th or(I−1)th row of the pixel regions.

Next, a method for fabricating the reflective liquid crystal display device according to Example 1 of the present invention will be described with reference to FIGS. 3A to 5D. FIGS. 3A to 5D are cross-sectional views for schematically describing the method for fabricating the reflective liquid crystal display device of the present example. In the following description, the plan view of FIG. 1 is also referred in addition to FIGS. 3A to 5D.

Figure 3A:
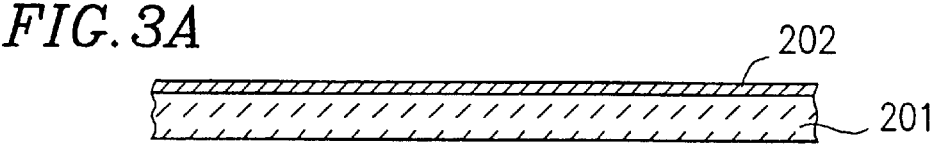
FIGS. 3A to 3H are cross-sectional views illustrating a method for fabricating the reflective liquid crystal display device according to Example 1 of the present invention.

First, as shown in FIG. 3A, a Ta film 202 as a light-shielding film is formed on the transparent insulating plate 201 by sputtering so as to have a thickness of about 1000 Å to about 5000 Å. Although a 320 mm×400 mm glass having a thickness of about 1.1 mm is used as the plate 201 in Example 1, a material such as Si, plastic, or the like may be used.

Figure 3B:
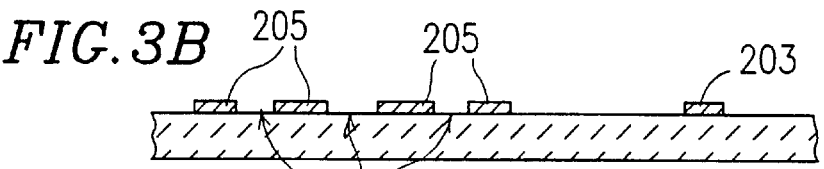

Subsequently, as shown in FIG. 3B, the Ta film 202 is patterned so as to form the gate signal line (not shown), the gate electrode 203, and the common electrode lines 205 for forming storage capacitors. Upon this patterning, the gate signal line and the common electrode lines 205 are patterned so as to have a plurality of the round holes 206 disposed at random.

The patterning is performed in the following manner: a positive photoresist is applied to the Ta film 202 by spin coating; the photoresist is exposed to light by a stepper exposure device; and developing, etching, and resist removal steps are performed (hereinafter, a series of the steps is referred to as a "photolithography step").

The holes 206 are patterned such that round holes each having a diameter of about 3 to about 10 μm are disposed at random so as to cover an area of about 2 to about 80% of the gate signal lines 204 and the common electrode lines 205. In Example 1 of the present invention, the holes 206 cover about 30% of the area of the gate signal lines 204 and the common electrode lines 205. Furthermore, the gate signal line 204 is provided with the hole 206 so that a portion of the pixel electrode 423 to be formed later which overlaps the gate signal line 204 has unevenness, and thus contributes to display (i.e., the structure in which concave and convex portions can be formed). In the case where such an overlapped portion is small, there is no need to provide the holes 206 in the gate signal lines 204.

A width of the common electrode line 205 and a width of the gate signal line 204 can be arbitrarily selected, as long as the accuracy of the photolithography of the lines 204 and 205 and the resistance of the lines 204 and 205 permit. In Example 1 of the present invention, the width of the common electrode line 205 is about 20 μm, and the width of the gate signal line 204 is about 30 μm.

Although the gate signal line 204 and the common electrode line 205 are formed of the same material in the present example, the present invention is not limited to such a structure. The gate signal line 204 and the common electrode line 205 may be formed of different materials. Moreover, according to Example 1 of the present invention, the gate signal line 204 and the common electrode line 205 are provided so as to overlap the pixel electrode 423 via the insulating layer 240 interposed therebetween. Even with such a structure, however, since a period of time during which voltage is applied to the gate signal line 204 is sufficiently short, an influence to the display quality due to capacitive coupling is negligible.

Figure 3C:
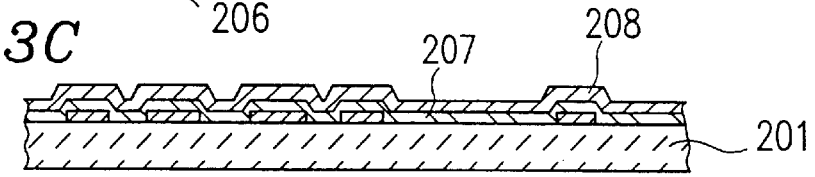

Next, as shown in FIG. 3C, a silicon nitride with a thickness of about 1000 to about 5000 Å is deposited using the plasma CVD technique so as to form the gate insulating film 207. Subsequently, silicon with a thickness of about 100 to about 500 Å is deposited using the plasma CVD technique so as to form the semiconductor layer 208. In the present example, the gate insulating film 207 and the semiconductor layer 208 are formed so as to have thicknesses of about 3000 Å and about 300 Å, respectively.

Figure 3D:
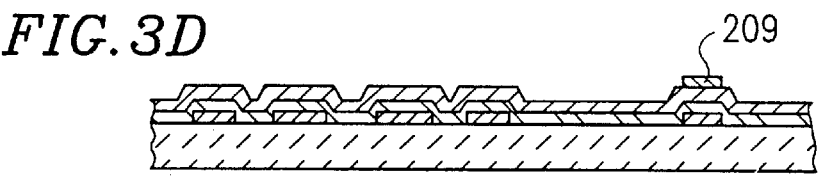

Thereafter, as shown in FIG. 3D, a silicon nitride to be an etching stopper 209 for the semiconductor layer is deposited by the plasma CVD technique so as to have a thickness of about 1000 to about 5000 Å. Then, the silicon nitride is patterned by photolithography. In the present example, the silicon nitride is deposited so as to have a thickness of about 3000 Å.

Figure 3E:
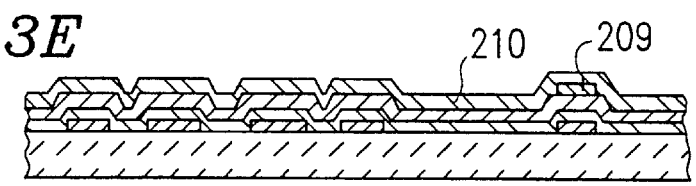
Figure 3F:
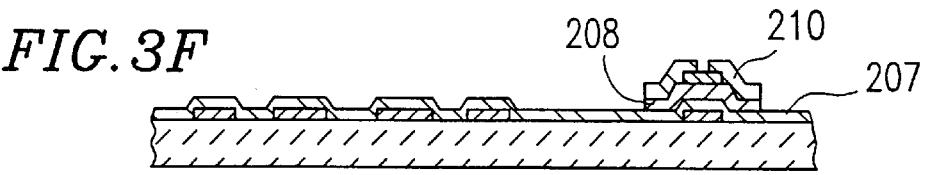

As shown in FIGS. 3E and 3F, an n-type silicon to which a small amount of impurities are introduced is deposited as the n-type semiconductor layer 210 by the plasma CVD technique so as to have a thickness of about 100 to about 1000 Å. In the present example, the n-type silicon is deposited so as to have a thickness of about 300 Å, and the n-type silicon is patterned by photolithography. Upon the patterning, the semiconductor layer 208 located under the etching stopper 209 previously formed is left unetched. Thereafter, a gate terminal connecting portion (not shown) at the end of the substrate in the previously formed gate insulating film 207 is removed by the photolithography step.

Figure 3G:
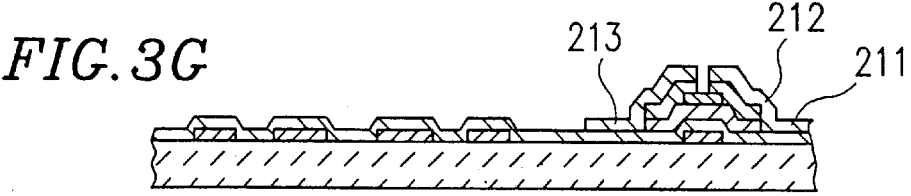

Next, as shown in FIG. 3G, Ti with a thickness of about 1000 to about 5000 Å is deposited by sputtering and patterned by the photolithography step so as to form the source signal line 211, the source electrode 212, and the drain electrode 213. In Example 1 of the present invention, the source signal line 211, the source electrode 212, and the drain electrode 213 are formed so as to have a thickness of about 3000 Å. In the reflective liquid crystal display device as shown in FIG. 1, since signals are continuously applied to the source signal line 211, cross talk may be caused if the source signal line 211 is disposed under the pixel electrode 423 with an insulating layer (not shown: in the present example, the insulating film is an uneven resist layer described below) interposed therebetween. Thus, it is desirable that the pixel electrode 423 and the source signal line 211 do not overlap. In the case where the structure in which the pixel electrode 423 and the source signal line 211 do not overlap is employed, thinner width of the source signal line 211 is desirable since wide line width reduces aperture ratio. On the other hand, if the width of the source signal line 211 is too thin, disadvantages such as line breakage due to a failure in the photolithography step and a rise in the line resistance may be caused. As a result, careful consideration is required for the width of the source signal line 211. For example, if the pixel size is about 100×300 μm, the width of the source signal line 211 is preferably in the range of about 5 to about 30 μm. In the present example, the width of the source signal line 211 is set to be about 10 μm.

Figure 7:
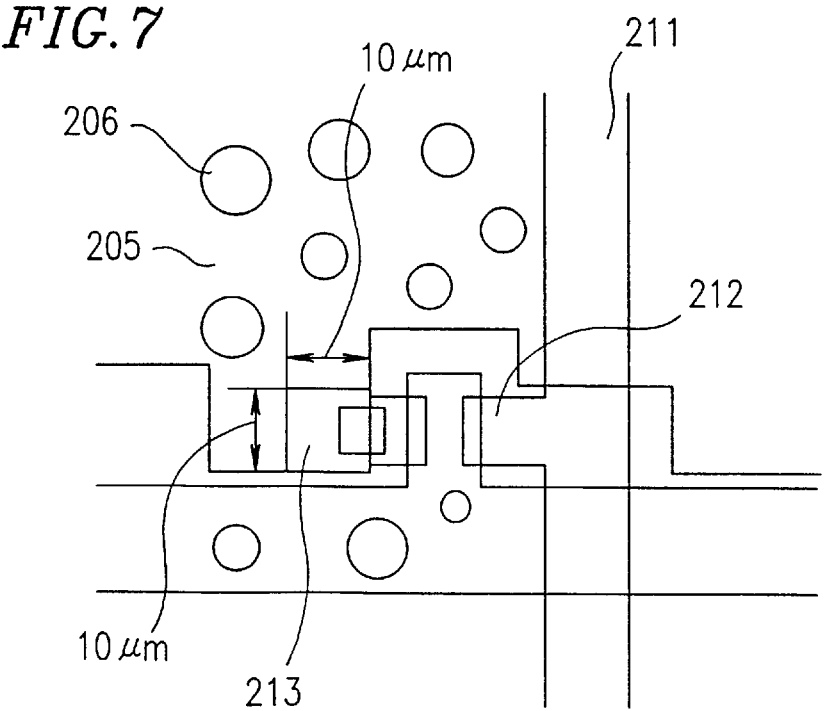
FIG. 7 is an enlarged partial view of a TFT according to Example 1 of the present invention.

The shape of the drain electrode 213 depends on its aperture ratio and the accuracy of its photolithography. Since the drain electrode 213 is formed of Ti, the electrode 213 has a light-shielding function. As a result, patterning by exposure from bottom side of the substrate is impossible, and thus concave and convex portions cannot be formed on the drain electrode 213. In other words, since the pixel electrode 423 region on the drain electrode 213 is less likely to contribute to display, it is desirable to make the drain electrode 213 as small as possible in order to obtain a high aperture ratio. On the other hand, in order to maintain electrical connection between the drain electrode 213 and the pixel electrode 423 disposed thereabove, an area satisfying a certain required size is needed. For the above-described reasons, in Example 1 of this invention, the drain electrode 213 is made to be a shape as shown in FIG. 7 and the size of the drain electrode 213 is set to be about 10×10 μm.

Figure 3H:
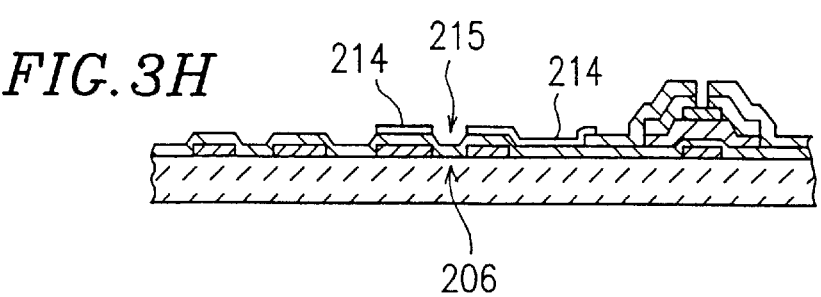

Subsequently, as shown in FIG. 3H, ITO with a thickness of about 200 to about 1500 Å is deposited by sputtering and patterned by the photolithography step so as to form the storage capacitor electrode 214. In the present example, the ITO film is formed so as to have a thickness of about 500 Å. Also, patterning of the storage capacitor electrode 214 is performed so as to provide holes 215 at positions approximately corresponding to the holes 206 in a light-shielding film (i.e., the common electrode line 205 in the present example) via a photomask having round holes. Especially when a material such as an opaque metal film and a semitransparent silicon film is used as the storage capacitor electrode 214, patterning should be conducted by placing the photomask having round holes above the storage capacitor electrode 214 in order to form the holes 215 at the positions corresponding to the holes 206 in the light-shielding film. In the case where the area of the storage capacitor electrode 214 is small, effect to the display is insignificant even when the storage capacitor electrode 214 has a light-transmitting function or a light-shielding function, or the storage capacitor electrode 214 is made of a semitransparent material. Thus, there is no need to provide round holes which correspond to the holes 206 in the light-shielding film. Also in the case where the storage capacitor electrode 214 is formed of the material which transmits light with wavelength to which resist 420 is photosensitive, there is no need to provide round holes which correspond to the holes 206 in the light-shielding film.

In the case where desired reflection characteristics cannot be obtained, for example, due to a disturbance in the orientation of liquid crystal molecules caused by a large distance between the highest point and the lowest point of the unevenness on the surface of the reflective electrode, no holes 215 may be formed in the storage capacitor electrode 214, or unevenness on the surface of the substrate may be controlled, for example, by changing the size of the holes 215.

Hereinafter, a method for forming the reflective pixel electrode 423 whose surface has concave and convex portions for scattering light will be described with reference to FIGS. 4A–4D.

Figure 4A:
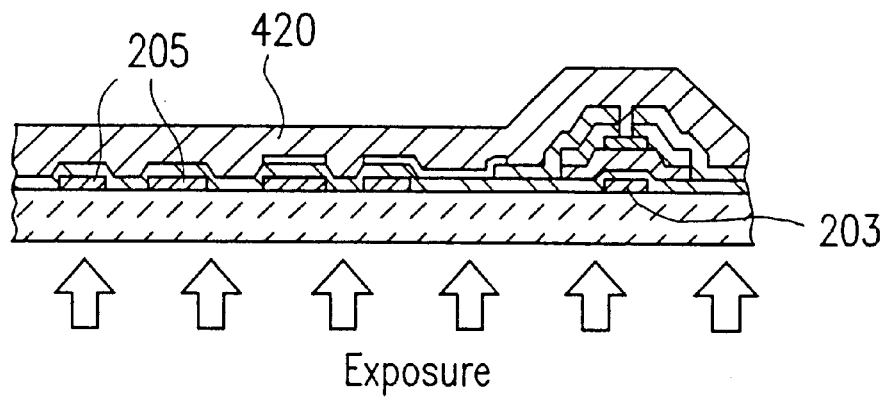
FIGS. 4A to 4D are cross-sectional views illustrating the method for fabricating the reflective liquid crystal display device according to Example 1 of the present invention.

First, as shown in FIG. 4A, OFPR-800 (trade name) manufactured by Tokyo Ohka Kogyo Co., Ltd., for example, is used as the resist 420. The resist 420 is formed by spin coating so as to have a thickness of about 1.0 μm. Next, the thus obtained substrate is pre-baked at about 100° C. for about 30 seconds, and is then exposed to light from its bottom side with a light-shielding region such as the gate signal line 204 and the common electrode line 205 used as a mask. Thus, no stepper is required, and the entire 320 mm×400 mm substrate can be exposed to light at once since the exposure is conducted using a bottom side exposure device. As a result, no joints can be seen at the concave and convex portions.

Figure 4B:
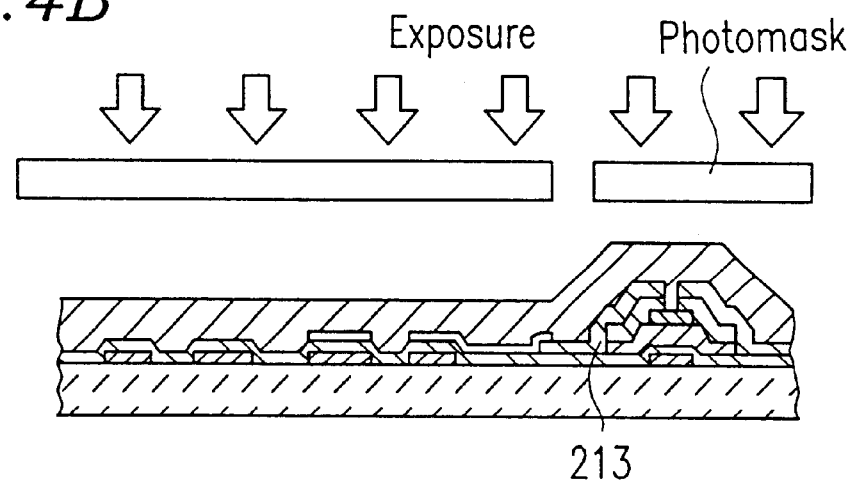
Figure 4C:
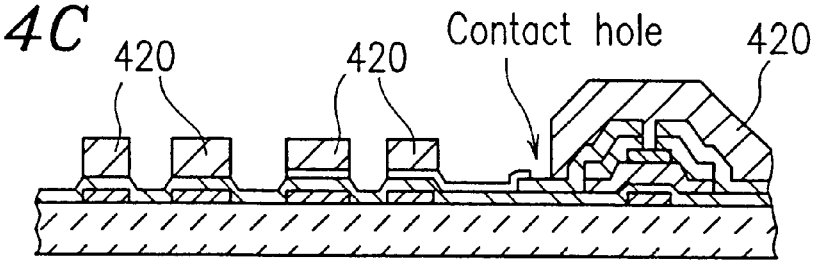
Figure 4D:
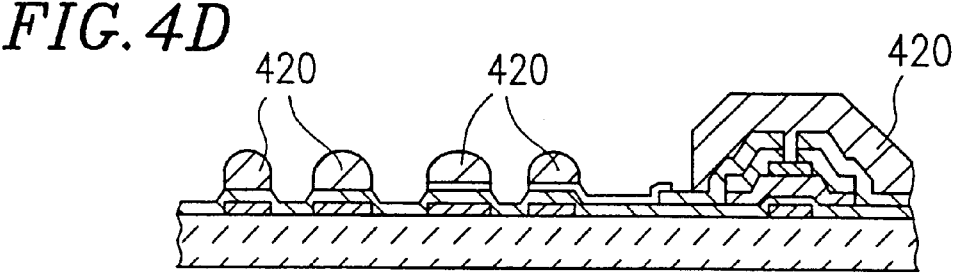

Subsequently, as shown in FIG. 4B, in order to form a contact hole on the drain electrode 213 using a stepper exposure device, the resist 420 is exposed to light after a photomask is placed above the resist 420. Next, as shown in FIG. 4C, the thus obtained substrate is developed in a developing solution of 2.38% made from NMD-3 (trade name) manufactured by Tokyo Ohka Kogyo Co., Ltd. so that the resist 420 with minute concave and convex portions is formed. Next, as shown in FIG. 4D, the resultant substrate is heat-treated at a temperature of about 120 to about 250° C. After upper corners of the remaining portions of the resist 420 are rounded off, the remaining resist 420 is cured by heat treatment at about 200° C. for about 30 minutes. As a result, the surface of the thus obtained substrate has smooth and continuous unevenness.

Figure 5A:
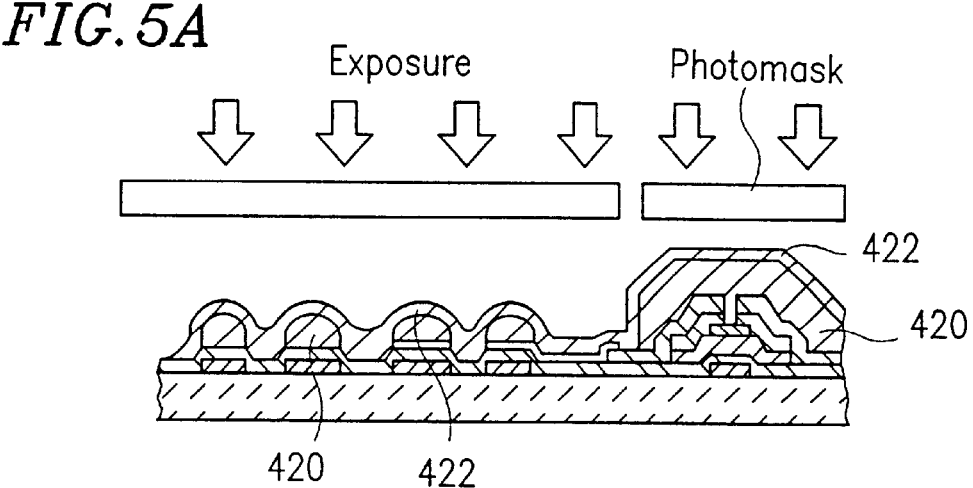
FIGS. 5A to 5D are cross-sectional views illustrating the method for fabricating the reflective liquid crystal display device according to Example 1 of the present invention.
Figure 5B:
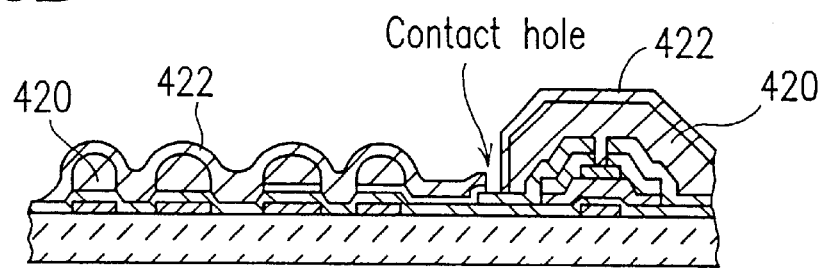

Next, in order to further smooth the unevenness, as shown in FIGS. 5A and 5B, the OFPR-800 (trade name) manufactured by Tokyo Ohka Kogyo Co., Ltd., which is used as the above-described resist 420, is used (but not limited thereto) as a second resist 422. The OFPR-800 is applied on the resist 420 by spin coating so as to have a thickness of about 0.3 μm. Next, the resultant substrate is pre-baked at about 100° C. for about 30 seconds. Thereafter, in order to form a contact hole in a region of the second resist 422 on the drain electrode using a stepper exposure device, a photomask is placed above the second resist 422, and the second resist 422 is exposed to light. Next, the thus obtained substrate is developed in a developing solution of 2.38% made from NMD-3 (trade name) manufactured by Tokyo Ohka Kogyo Co., Ltd. Subsequently, the resultant substrate is heat-treated at about 200° C. for about 30 minutes.

Figure 5C:
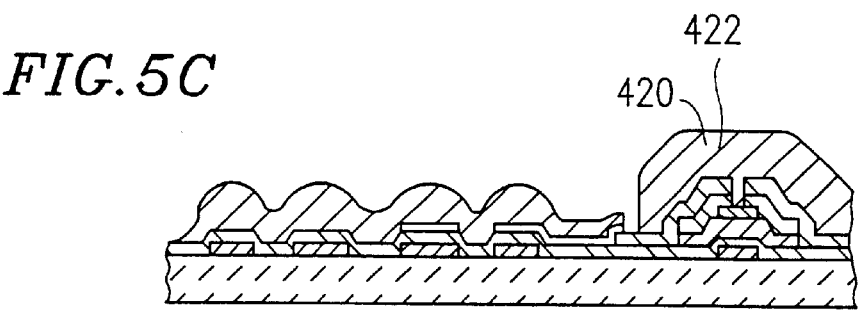

Next, as shown in FIG. 5C, the above-described heat-treatment causes the melting of the second resist 422, resulting in smoother concave and convex portions having less flat areas.

Figure 5D:
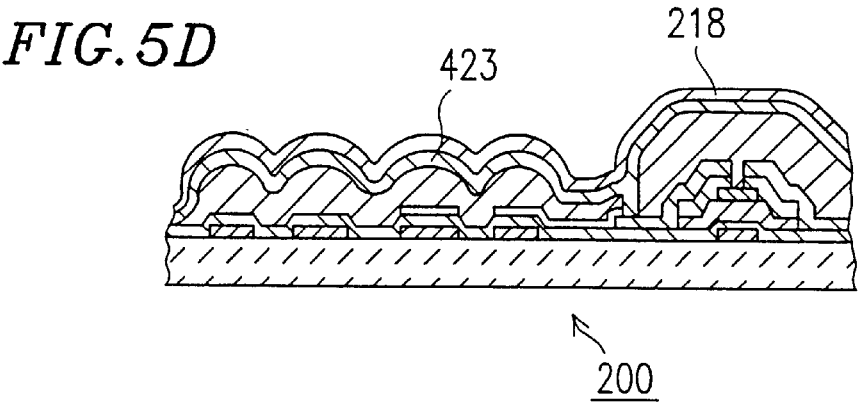

Finally, as shown in FIG. 5D, Al with a thickness of about 500 to about 5000 Å is deposited by sputtering and patterned by the photolithography step so as to form the reflective pixel electrode 423. In the present example, the reflective pixel electrode 423 is formed so as to have a thickness of about 2000 Å. After the pixel electrode 423 is formed, the alignment film 218 is formed thereon. In this manner, the reflective electrode side substrate 200 is completed.

The reflective electrode side substrate 200 and its counter substrate, i.e., the color filter side substrate 300 including the color filter 302, the counter electrode 303, and the alignment film 218 provided on the plate 301 are attached to each other via spacers. Then, a liquid crystal layer is filled between the two substrate 200 and 300. In the present example, a mixture of a guest-host liquid crystal containing black pigment and a small amount of an optically active substance is used. A birefringence mode in which a reflective plate or a phase difference plate is set may be used.

By the steps described above, the reflective liquid crystal display device according to Example 1 of the present invention is completed.

When this reflective liquid crystal display device is turned ON for display, neither joints nor non-uniformity in reflection characteristics can be observed on the display, and uniform display can be obtained over the entire display screen.

Figure 6:
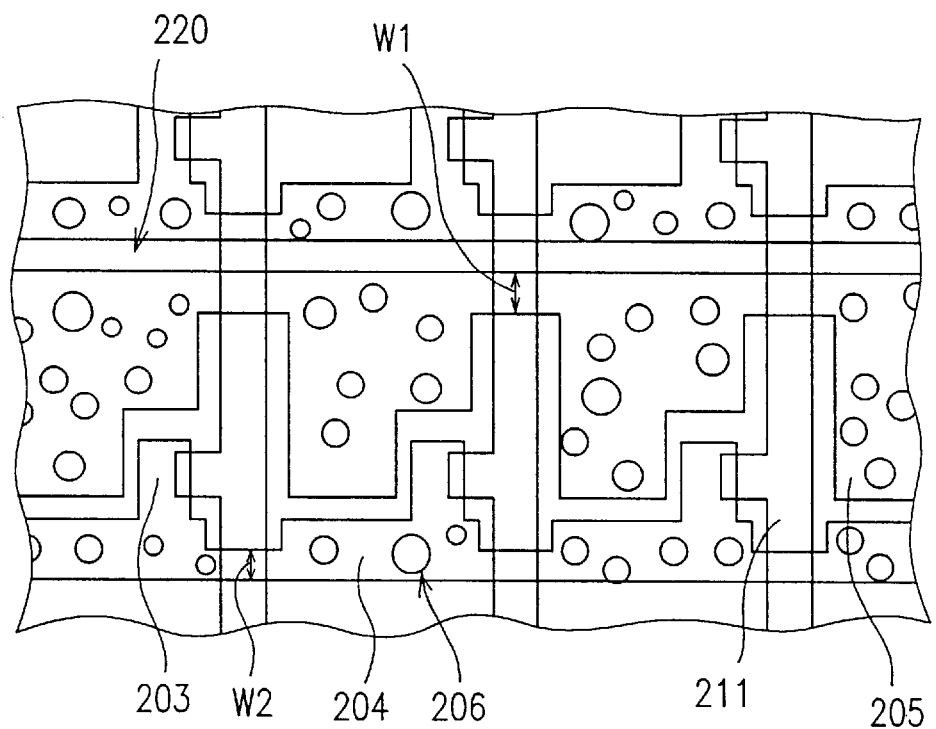
FIG. 6 is a plan view illustrating a portion of a reflective liquid crystal display device according to one example of the present invention.

According to the present example, in particular as shown in FIG. 6, a linear groove exists in a gap 220 between the gate signal line 204 and the common electrode line 205. As a result, when ambient light is incident on the pixel electrode, reflection in a direction perpendicular to the groove becomes especially intense. In other words, the reflective display device with reflection characteristics in which display is brighter in a direction perpendicular to the gate signal line 204 is obtained.

As shown in FIG. 6 (the drain electrode, the contact hole, and the storage capacitor electrode are omitted), the patterning of the common electrode line 205 and the patterning of the gate signal line 204 are performed so as to make an overlapped portion W1 between the common electrode line 205 and the source signal line 211 and an overlapped portion W2 between the gate signal line 204 and the source signal line 211 small, i.e., the width of the common electrode line 205 is the smallest at the overlapped portion W1 between the common electrode line 205 and the source signal line 211, and the width of the gate signal line 204 is smallest at the overlapped portion W2 of the gate signal line 204 and the source signal line 211. As a result, the occurrence of cross talk can be suppressed as compared to the case shown in FIG. 1.

As described above, according to the reflective liquid crystal display device of this invention, when the insulating layer is patterned to form the concave and convex portions on the surface thereof, it becomes possible to realize self-alignment by performing exposure from the bottom side of the substrate with the light-shielding region below the insulating layer used as a mask pattern. Accordingly, no photomask is required, and full plate exposure by a large exposure device becomes possible. As a result, joints and non-uniformity in display, both of which are caused by the stepper exposure, can be overcome. In addition, since the storage capacitor electrode is provided, a storage capacitor for driving a liquid crystal molecule can be formed. As a result, the reflective liquid crystal display device having a satisfactory display quality is obtained.

EXAMPLE 2

Figure 8:
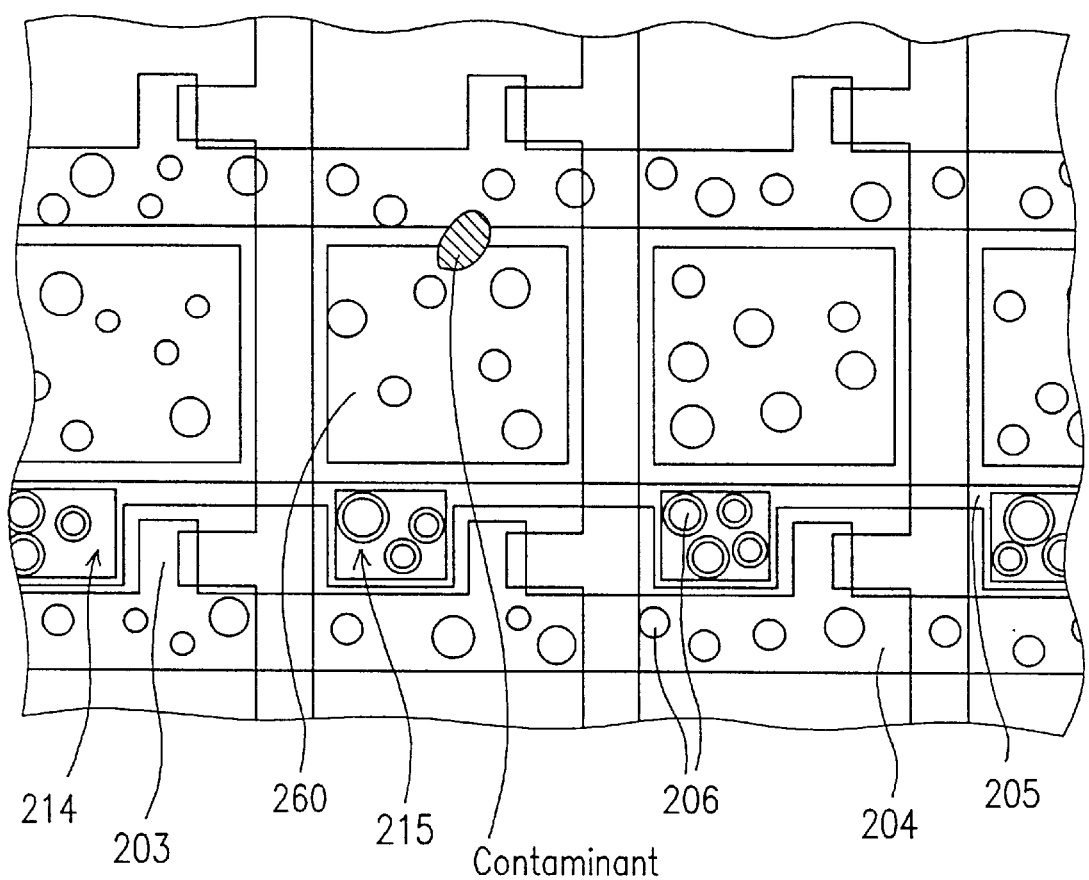
FIG. 8 is a plan view illustrating a portion of a reflective liquid crystal display device according to Example 2 of the present invention.

Example 2 of the present invention differs from the above-described Example 1 in that in addition to the gate signal line and the common electrode line, an island-shaped light-shielding region is independently provided for each pixel as a light-shielding region having holes. FIG. 8 is a plan view illustrating a portion of a reflective liquid crystal display device according to Example 2 of the present invention. Although the drain electrodes, the contact holes, and the pixel electrodes are omitted in FIG. 8, the reflective liquid crystal display device of Example 2 has the same structure as that in the above-described display device of Example 1 regarding the omitted components.

As shown in FIG. 8, holes (openings) 206 which transmit light therethrough are provided in a light-shielding area 260 which is patterned in an island shape so as to correspond to each pixel, a common electrode line 205, and a gate signal line 204. The other structures are the same as those in Example 1.

Hereinafter, a method for fabricating the reflective liquid crystal display device of Example 2 will be described. First, a Ta film with a thickness of about 1000 to about 5000 Å is formed on a transparent insulating plate by sputtering. Next, the Ta film is patterned by the photolithography step so as to form the gate signal line 204, a gate electrode 203, the common electrode line 205 for forming a storage capacitor, and the island-shaped light-shielding area 260. At this time, the same holes as those in Example 1 are simultaneously patterned.

In the same manner as in Example 1, the following steps are conducted, and thus the reflective liquid crystal display device of Example 2 is completed.

When the thus obtained reflective liquid crystal display device is turned ON for display, neither joints nor non-uniformity in reflection characteristics caused by the patterning process using a stepper exposure device can be seen on the display. Uniform display is observed over the entire display screen. Especially in the present example, even when a contaminant such as a conductive particle exists in a gap 220, defects are less likely to be noticed at the time of display. The reason for this is as follows. Since the light-shielding area 260 has an independent island shape for each pixel, a gate signal is not input to the all pixels along the same gate signal line 204. Accordingly, such contaminant in the gap 220 results only in dot defect which occurs in a single pixel unit, and line defect can be avoided.

EXAMPLE 3

Figure 9:
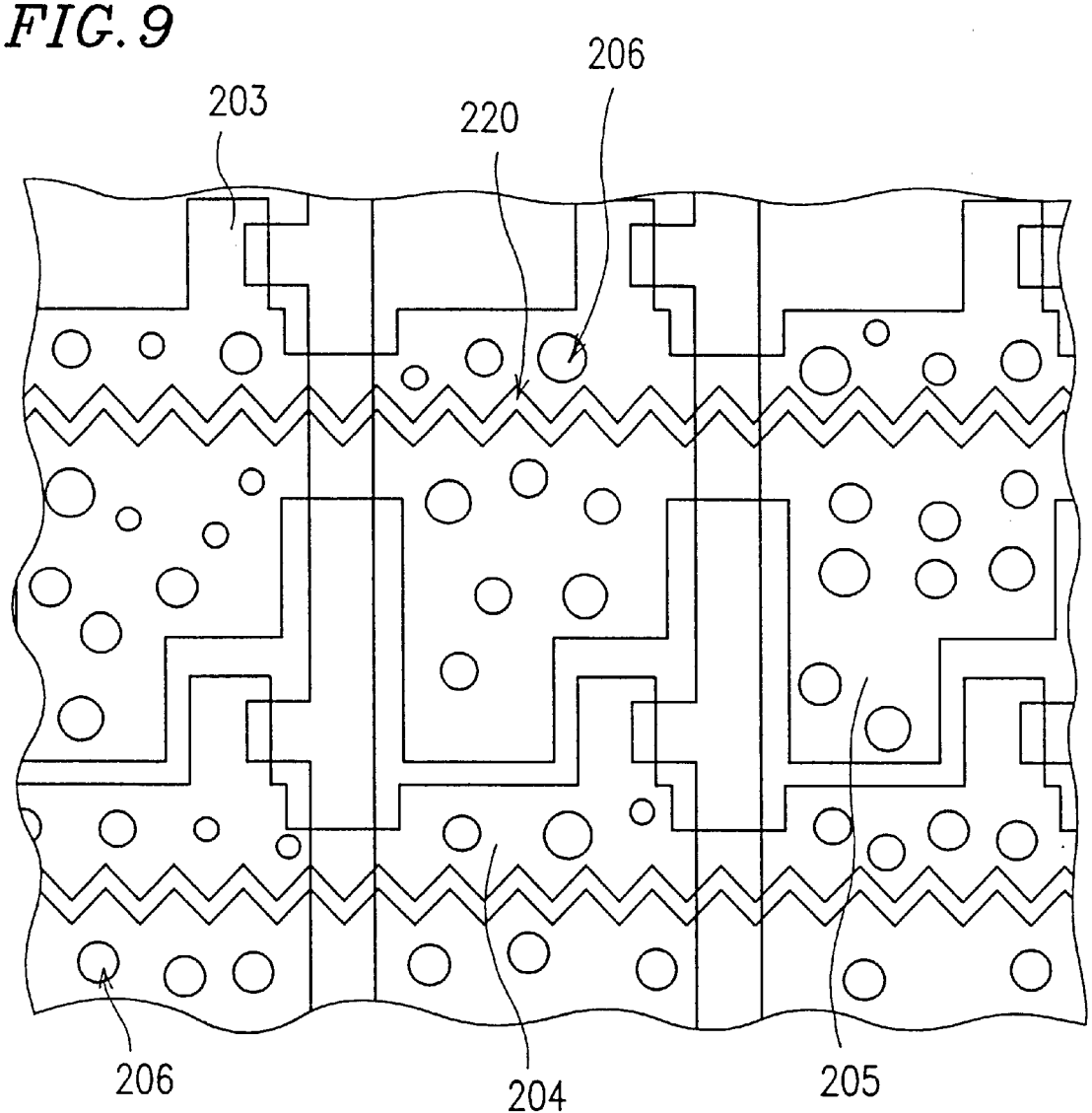
FIG. 9 is a plan view illustrating a portion of a reflective liquid crystal display device according to Example 3 of the present invention.

Example 3 of this invention is identical to the above-described Example 1 in that the light-shielding region having holes (openings) consists of the gate signal line and the common electrode line. However, Example 3 differs from Example 1 in that the gap between the gate signal line and the common electrode line has a zigzag shape. FIG. 9 is a plan view illustrating a portion of a reflective liquid crystal display device according to Example 3 of the present invention. Although the drain electrodes, the contact holes, and the storage capacitor electrodes are omitted in FIG. 9, they have the same structures as those in the above-described examples.

In FIG. 9, the lower side of the gate signal line 204 and the upper side of the common electrode line 205, which constitute the gap 220, have zigzag shapes. The peak of the gate signal line and the peak of the common electrode are positioned so as to oppose to each other. On the surface of the reflective pixel electrode (not shown) disposed above the gap 220, unevenness in a zigzag groove shape is formed so as to correspond to the zigzag gap 220 between the gate signal line 204 and the common electrode line 205.

Hereinafter, a method for fabricating the reflective liquid crystal display device of Example 3 will be described. First, in the same manner as in Example 1, a Ta film 202 with a thickness of about 1000 to about 5000 Å is formed on a transparent insulating plate 201 by sputtering. Next, the Ta film is patterned by the photolithography step so as to form the gate signal line 204, a gate electrode 203, and the common electrode line 205 for forming a storage capacitor. The mask pattern employed in Example 3 differs from that used in Example 1. The following steps are performed in the same manner as in Example 1. Thus, the reflective liquid crystal display device of Example 3 is completed.

When this reflective liquid crystal display device is turned ON for display, neither joint nor non-uniformity in reflection characteristics can be seen on the display, and uniform display can be observed over the entire display screen.

In particular, since unevenness in a zigzag groove shape is formed on the surface of a pixel electrode 423 corresponding to the gap 220, a reflective display device whose display is uniformly bright in all directions is obtained.

Although the gap 220 is formed in a zigzag shape in the present example, the shape of the gap 220 is not limited thereto. Any shape may be employed as long as the shape enables incident light to be scattered in all directions.

EXAMPLE 4

Figure 10:
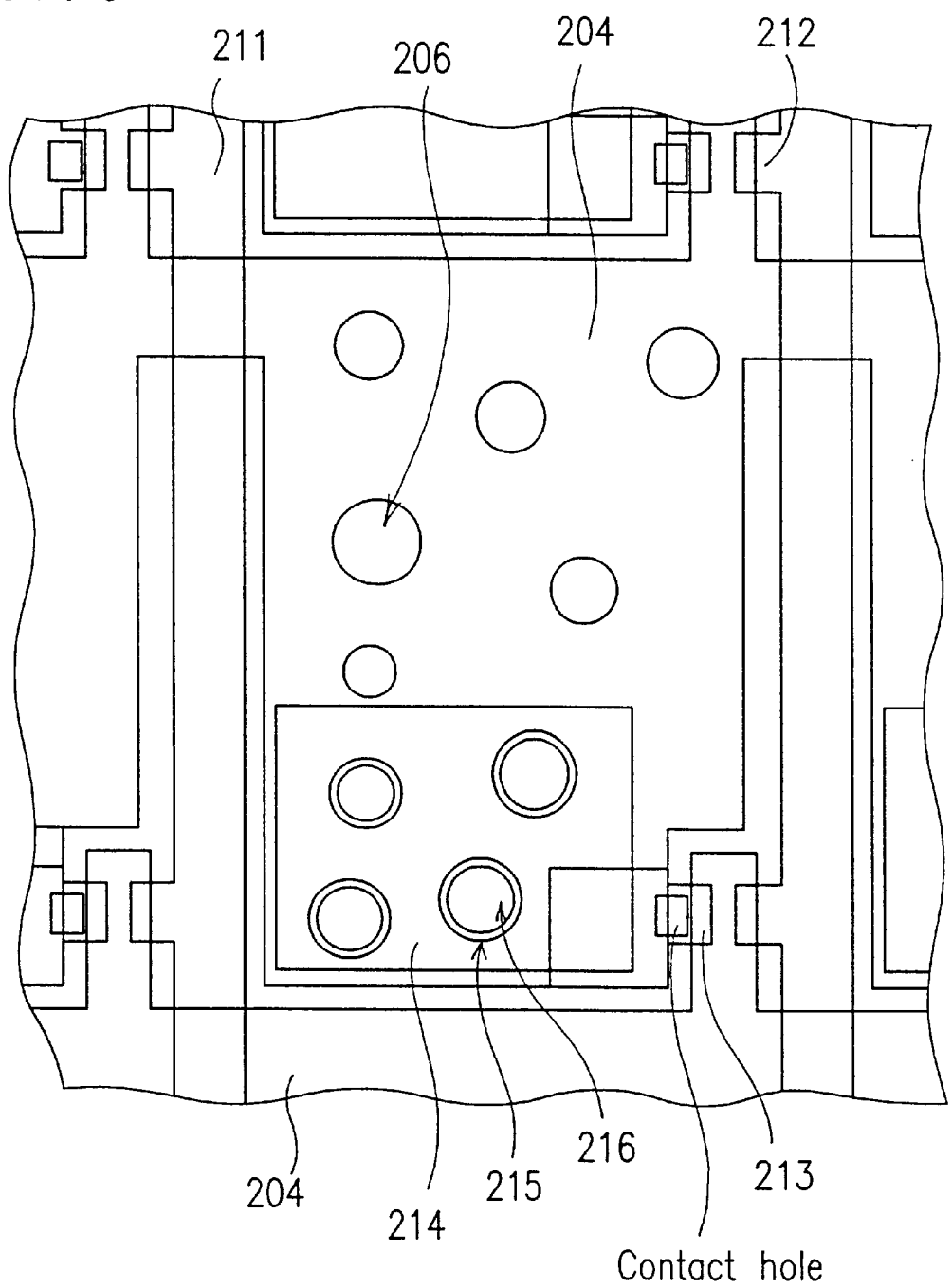
FIG. 10 is a plan view illustrating a portion of a reflective liquid crystal display device according to Example 4 of the present invention.

In Example 4 of the present invention, the case where a storage capacitor electrode overlaps a gate signal line will be described. FIG. 10 is a plan view illustrating a reflective liquid crystal display device according to Example 4 of the present invention.

Hereinafter, a method for fabricating this reflective liquid crystal display device will be described. In the same manner as in Example 1, a Ta film with a thickness of about 1000 to about 5000 Å is formed on a transparent insulating plate by sputtering.

Next, the Ta film is patterned by the photolithography step so as to form a gate signal line 204 and a gate electrode 203. According to the present example, a part of the gate signal line 204 extends into a pixel so as to overlap with a storage capacitor electrode 214. As a result, the common electrode line which is formed in the above-described examples is not necessary. Thus, the storage capacitor electrode in Ith row of pixel regions does not overlap a gate signal line in the Ith row which supplies a signal to the switching element, but it overlaps the gate signal line in (I+1)th or (I−1)th row of the pixel regions. Accordingly, a so-called "Cs-on-Gate" type structure is obtained.

In the same manner as in Example 1, the following steps are conducted, and the reflective liquid crystal display device of Example 4 is thus completed. When this reflective liquid crystal display device is turned ON for display, neither joint nor non-uniformity in reflection characteristics can be observed on the display, and uniform display is obtained over the entire display screen.

In Example 4 of the present invention, the gaps formed in Examples 2 and 3 are not provided. Accordingly, as compared to the reflective liquid crystal display devices of Examples 2 and 3, concave and convex portions can be formed in greater numbers on the surface of the pixel electrode. Thus, the reflective liquid crystal display device of Example 4 has the advantage of improved scattering characteristics.

Although the present invention is applied to a bottom-gate type TFT in the above-described Examples 1 to 4, the present invention is not limited to this type of TFT. The present invention may be applied to a top-gate type TFT.

EXAMPLE 5

As in Example 4, the structure in which a storage capacitor electrode overlaps a gate signal line via a gate insulating film interposed therebetween (i.e., "Cs-on-Gate" structure) will be described in Example 5.

Figure 11:
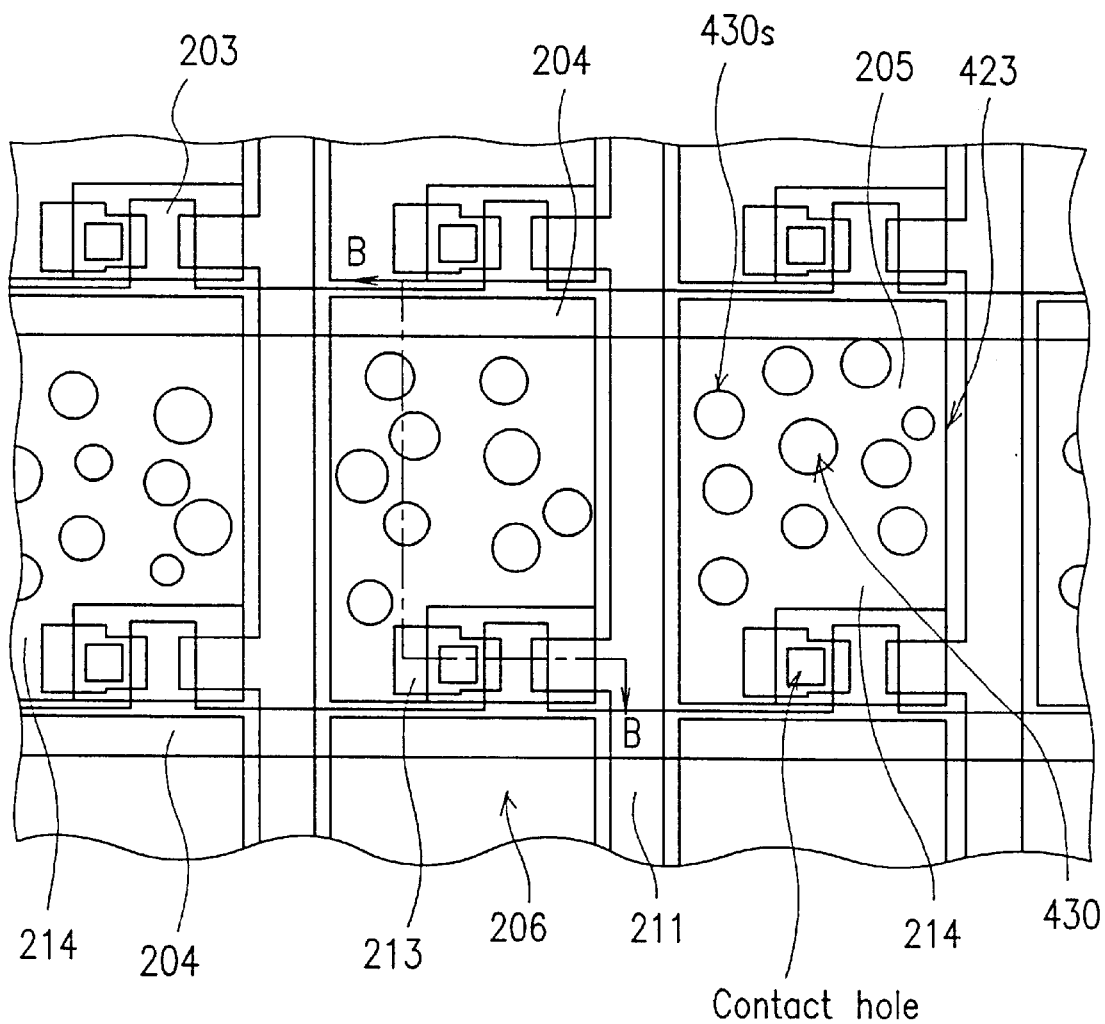
FIG. 11 is a plan view illustrating a portion of a reflective liquid crystal display device according to Example 5 of the present invention.

FIG. 11 is a plan view illustrating a reflective liquid crystal display device according to Example 5 of the present invention. FIGS. 12A to 12F are cross-sectional views taken along a line B—B in FIG. 11, and these figures show a method for fabricating the reflective liquid crystal display device of Example 5. The reflective liquid crystal display device shown in FIG. 11 includes a reflective electrode side substrate, the color filter side substrate of Example 1, and a liquid crystal layer interposed therebetween.

First, the structure of the reflective liquid crystal display device in the present example will be described with reference to FIG. 11.

The reflective electrode side substrate includes: a plate 201 (FIGS. 12A–12F); a gate signal line 204 and a source signal line 211 provided on the plate 201; a TFT 230 provided at the intersection of the gate signal line 204 and the source signal line 211; an insulating layer (not shown) covering at least a portion of the signal lines 204 and 211 and the TFT 230; a pixel electrode 423 connected to a drain electrode 213 of the TFT 230 via a contact hole provided in the insulating layer; a light-shielding layer 430 having a plurality of cylindrical Ta films (light-shielding portions 430s); a storage capacitor electrode 214; and an alignment film 218 (not shown). As in Example 4, the reflective electrode side substrate in the present example has no common electrode line. Moreover, the storage capacitor electrode 214 is connected to the drain electrode 213, and the storage capacitor electrode 214 in Ith row of the pixel regions also overlaps gate signal line 204 in the (I+1)th or (I−1)th row of the pixel regions with the insulating film interposed therebetween. Accordingly, a storage capacitor for driving a liquid crystal molecule is formed.

The pixel electrode 423, the TFT 230, and the color filter side substrate in Example 5 are the same as those described in the above-described examples.

According to the reflective liquid crystal display device of Example 5, the light-shielding portions 430s are disposed at random within pixel regions surrounded by the gate signal lines 204 and the source signal lines 211. On the surfaces of the resist 421 formed of positive photosensitive resin and the pixel electrode 423, both of which are formed above the light-shielding layer 430, there are concave and convex portions corresponding to the shapes of the light-shielding layer 430. When light is incident from outside of the liquid crystal display device upon such concave and convex portions on the surface of the pixel electrode 423 having a light reflecting function, light is scattered on the surface, thereby realizing a paper white display.

Next, a method for fabricating the reflective liquid crystal display device of Example 5 will be described with reference to FIGS. 12A–12F as well as the plan view shown in FIG. 11.

Figure 12A:
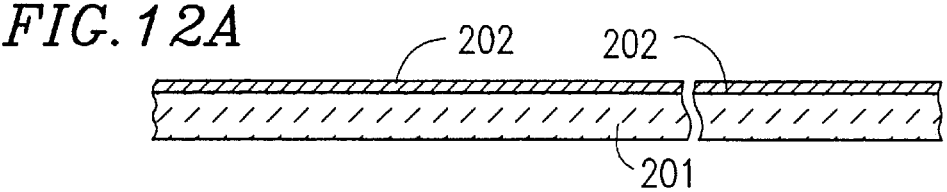
FIGS. 12A to 12F are cross-sectional views for schematically describing a method for fabricating the reflective liquid crystal display device according to Example 5 of the present invention.

First, as shown in FIG. 12A, in the same manner as in Example 1, a Ta film 202 is formed on the transparent insulating plate 201. The Ta film 202 does not transmit light.

Figure 12B:
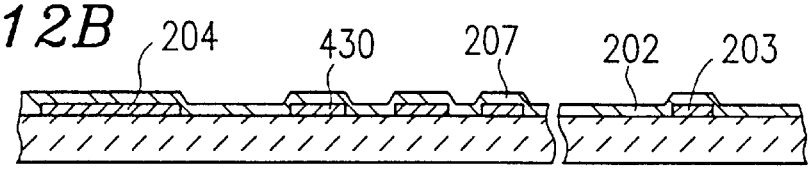

Subsequently, as shown in FIG. 12B, the Ta film 202 is patterned so as to form the gate signal line 204, the gate electrode 203, and the light-shielding layer 430. Then, a gate insulating film 207 is applied to the entire display section.

The width of the gate signal line 204 can be arbitrarily selected, to the extent permitted by the accuracy of the photolithography of the line 204 and resistance of the line 204. In the present example, the width of the gate signal line 204 is set to be about 30 $\mu$m.

The light-shielding layer 430 has a plurality of cylindrical Ta films (light-shielding portions 430s) disposed at random in a separate manner. For the purpose of obtaining excellent reflection characteristics, a distance between two adjacent cylindrical Ta films is preferably in a range of about 3 to about 50 microns. In the present example, a distance between two adjacent cylindrical Ta films is set to be in such a preferable range. The light-shielding layer 430 is preferably patterned such that cylinders with a diameter of about 3 to about 10 microns are disposed at random so as to cover an area of about 2 to about 80% of the pixel region surrounded by the gate signal lines 204 and the source signal lines 211. In the present example, the cylinders are disposed so as to cover about 30% of the pixel.

Figure 12C:
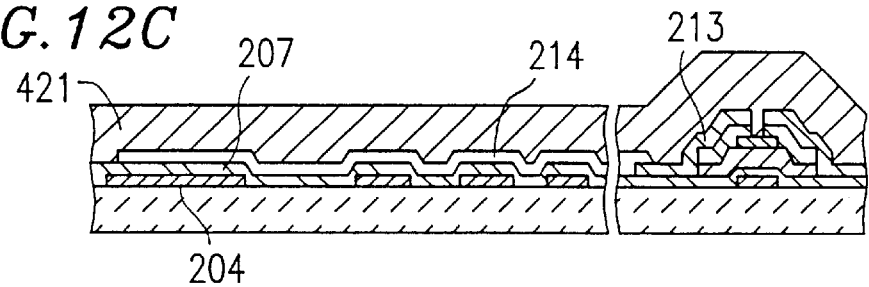

Next, as shown in FIG. 12C, the TFT 230 having the same structure as that in the above-described examples is formed. The storage capacitor electrode 214 to be connected to the TFT 230 is formed from an ITO film, and the insulating layer 421 made of positive photosensitive resin is applied thereto by spin coating. While the storage capacitor electrode 214 is formed so as to be electrically connected to the drain electrode 213, the storage capacitor electrode 214 in the Ith row of the pixel regions overlaps the gate signal line 204 in the (I+1)th or (I−1)th row of the pixel regions with the gate insulating film 207 interposed therebetween. Although the storage capacitor electrode 214 is formed of the ITO film in the present example, the material of the electrode 214 is not limited thereto. The storage capacitor electrode 214 may be a conductive metallic film, and it may be either transparent or opaque.

Figure 12D:
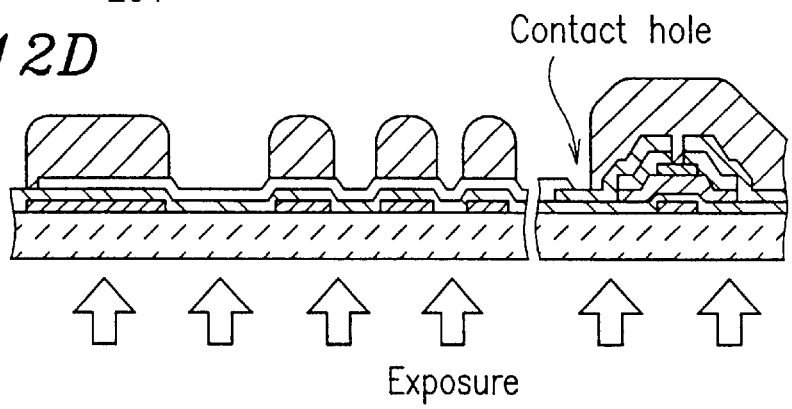

Thereafter, the thus obtained substrate is exposed to light by means of full plate exposure from the bottom side of the substrate. By performing the photolithography step and the subsequent heat treatment step, a surface having smooth and continuous concave and convex portions are formed on the surface of the substrate as shown in FIG. 12D. These steps are performed in the same manner and under the same condition as those in Example 1. The contact hole for electrically connecting the drain electrode 213 and the pixel electrode 423 in a later step is formed in the same manner as in Example 1.

According to Example 5 of the present invention, exposure is conducted from the bottom side of the substrate with the light-shielding region such as the gate signal line 204, the light-shielding layer 430, and the like used as a mask. As a result, no alignment between the mask and the substrate is required. Moreover, since self-alignment using the bottom-side exposure device is possible without employing a stepper, a relatively large substrate, for example, of about 320×400 mm, can be exposed to light at once. Thus, no joint is generated on the display.

Next, for the purpose of further smoothing the concave and convex portions, a second resist (not shown) is applied thereto. After the resultant substrate is pre-baked, the contact hole is formed, and heat-treatment is conducted at about 200° C. for about 30 minutes. As a result, smoother concave and convex portions having less flat areas are formed on the surface of the substrate as shown in FIG. 12E.

Figure 12E:
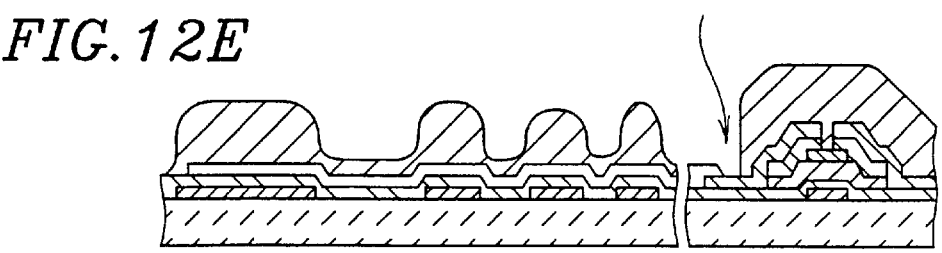
Figure 12F:
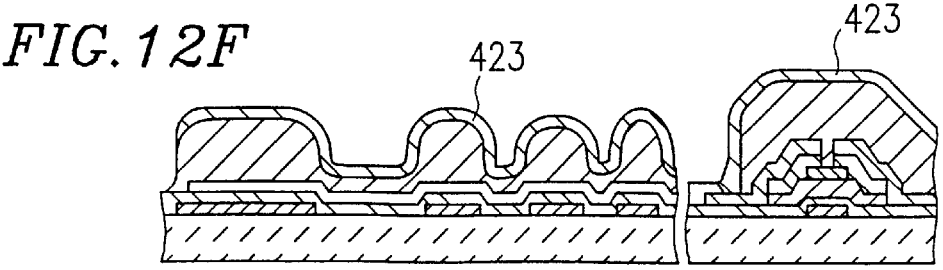

As shown in FIG. 12F, in the same manner as in Example 1, Al is deposited on the substrate shown in FIG. 12E by sputtering, and then the Al film is patterned so as to form the reflective pixel electrode 423. After the pixel electrode 423 is formed, the alignment film (not shown) is formed thereon. Thus, the reflective electrode side substrate is completed.

The thus obtained reflective electrode side substrate and the color filter side substrate are attached to each other with spacers interposed therebetween Thereafter, a liquid crystal layer is filled between the two substrates. In the present example, the mixture of a guest-host liquid crystal containing black pigment and a small amount of an optically active substance is used.

In the manner as described above, the reflective liquid crystal display device of Example 5 is completed.

In Example 5 of the present invention, the gate signal line 204 and the light-shielding layer 430 are formed in the same step since they are formed of the same metal material. However, the present invention is not limited to such a structure. The gate signal line 204 and the light-shielding layer 430 may be formed of different materials.

In order to prevent cross talk for the reasons explained in the above-described examples, the reflective liquid crystal display device as shown in FIGS. 12A–12F also has a structure in which the pixel electrode 423 and the source signal line 211 do not overlap. Moreover, the size of the drain electrode 213 is set to be about 10×10 μm for the same reason as that in the above-described examples.

According to Example 5 of the present invention, no holes are provided in the storage capacitor electrode 214. Depending on desired reflection characteristics, the holes 215 do not have to be provided in the storage capacitor electrode 214.

According to the present example, the storage capacitor electrode 214 overlaps the gate signal line 204 and no common signal line is provided. As a result, concave and convex portions can be formed in greater numbers within a pixel region, thereby improving light scattering characteristics. As compared to the above-described examples, especially within a pixel region surrounded by the source signal lines 211 and the gate signal lines 204, rounded areas on the surface of the substrate (i.e., convex portions in the case where positive type resist is used, and concave portions in the case where negative type resist is used) can be provided at positions closer to the gate signal line. As a result, concave and convex portions can be formed in greater numbers and over a wider area.

Figure 13:
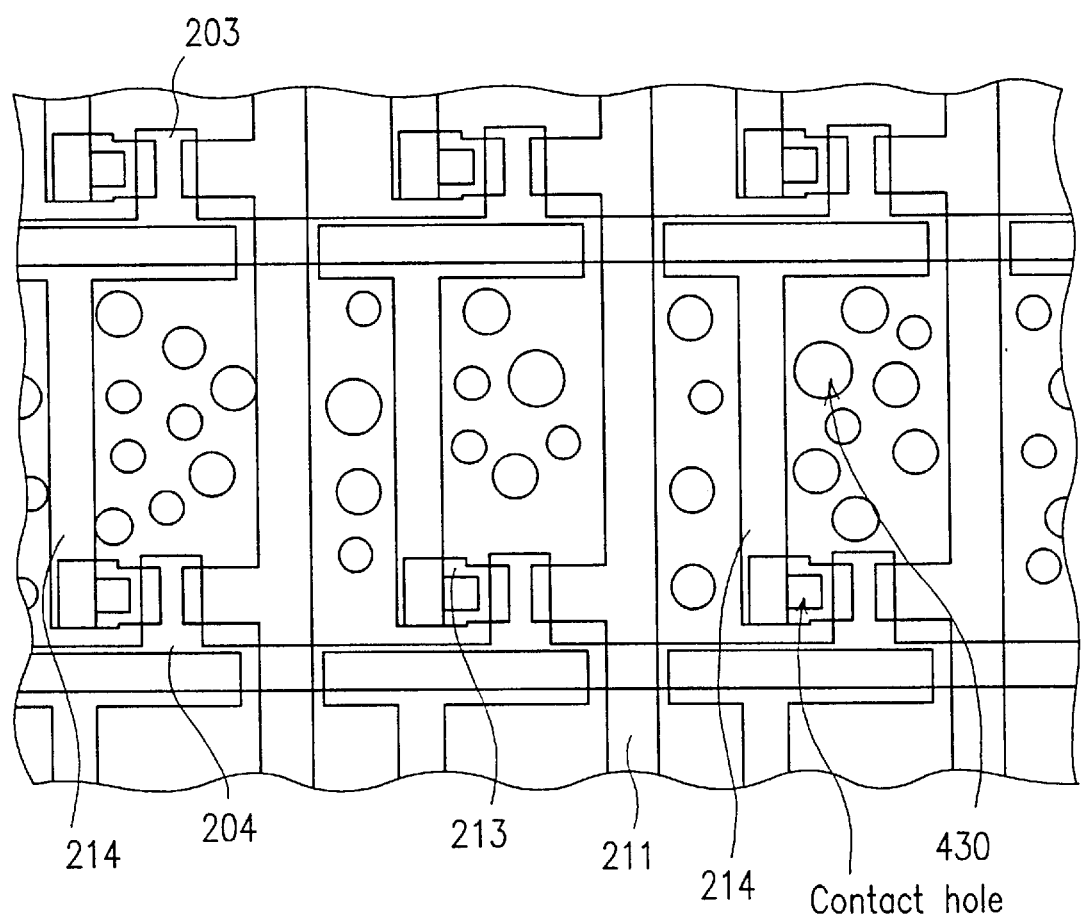
FIG. 13 is a plan view illustrating another example of the reflective liquid crystal display device of Example 5 according to the present invention.
Figure 14:
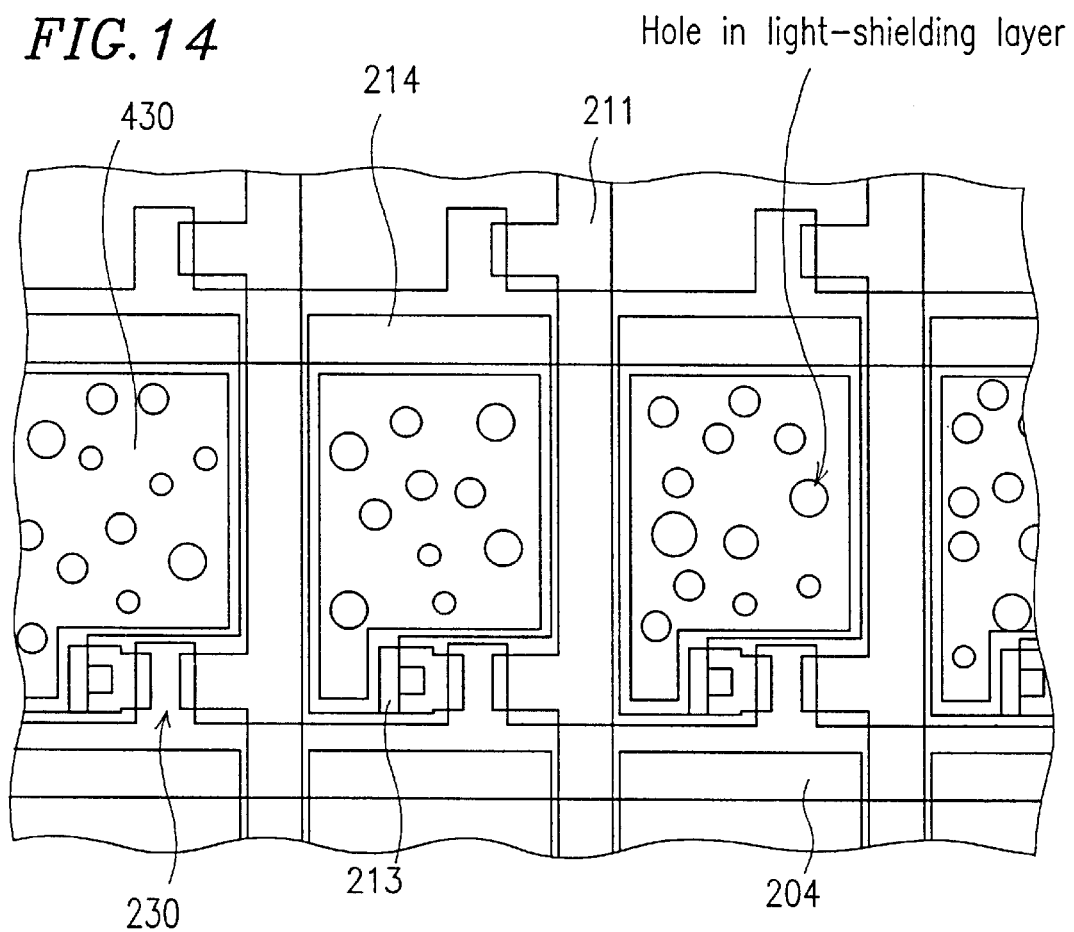
FIG. 14 is a plan view illustrating yet another example of the reflective liquid crystal display device of Example 5 according to present invention.

Other examples of the Cs-on-Gate type liquid crystal display device according to Example 5 of the present invention are shown in FIGS. 13 and 14. Although the reflective electrode is omitted for the purpose of simplicity in FIGS. 13 and 14, the reflective electrode is connected to the TFT drain electrode via the contact hole as in Example 5. Reference numerals in FIGS. 13 and 14 are the same as those explained in the above-described examples.

Differences between Example 5 and other examples of the liquid crystal display device according to Example 5 are as follows. The shape of a storage capacitor electrode 214 shown in FIG. 13 differs from the shape of the storage capacitor electrode 214 of Example 5 shown in FIG. 11. The shape of the light-shielding layer in FIG. 14 is the same as that in Example 1.

Although the reflective liquid crystal display devices and the methods for fabricating the same according to the present invention are described with reference to Examples 1 to 5, the present invention is not limited to these examples.

For example, although the present invention is applied to the bottom-gate type TFT in the above-described examples, the present invention may be also applied to the top-gate type TFT. Moreover, an overlapped portion of the gate signal line 204 and the pixel electrode 423 to be formed later may be structured so as to be a display section (i.e., the structure in which concave and convex portions can be formed). Furthermore, patterns provided in the light-shielding layer for forming concave and convex portions are not limited to rounded shapes. For example, the shape of the patterns may be polygonal, elliptical, strip, or the like.

As described above, according to the present example, since the pattern of unevenness on the surface of the reflective pixel electrode is formed by self-alignment due to the bottom side exposure. As a result, steps for fabricating the reflective liquid crystal display device can be simplified, and joints caused by a plurality of exposure steps using a stepper exposure device can be avoided. Accordingly, the reflective liquid crystal display device realizing uniform display having no joints is obtained. Moreover, since the storage capacitor electrode is provided, a storage capacitor for driving liquid crystal molecules can be formed, thereby realizing the reflective liquid crystal display device having excellent display quality.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflective liquid crystal display device having a plurality of pixel areas comprising:

a pair of transparent plates;

a liquid crystal layer interposed between the pair of plates;

a light-shielding layer provided on one of the plates, the light-shielding layer having a light-shielding portion, the light-shielding layer also having plural light-transmitting portions corresponding to one of the pixel areas;

a storage capacitor electrode;

an insulating layer covering the light-shielding layer and the storage capacitor electrode, the insulating layer having concave and convex surfaces; and a reflective pixel electrode provided on the concave and convex surfaces of the insulating layer, wherein the light-shielding layer has a common signal line; and wherein the storage capacitor electrode overlaps the common signal line via an insulating layer interposed therebetween so as to form a storage capacitor.

2. A reflective liquid crystal display device according to claim 1, wherein the storage capacitor electrode has an opening at a position corresponding to the light-transmitting portion of the light-shielding layer.

3. A reflective liquid crystal display device according to claim 1, wherein a shape of the light-transmitting portion of the light-shielding layer is approximately round; a distance between two adjacent light-transmitting portions is in a range of about 3 to about 50 microns.

4. A reflective liquid crystal display device according to claim 1, wherein the storage capacitor electrode is a transparent electrode.

5. A method for fabricating a reflective liquid crystal display device including a liquid crystal layer interposed between two substrates and having a plurality of pixel areas, comprising the steps of:

forming a light-shielding layer on a plate of one of the two substrates, the light-shielding layer having a light-shielding portion, the light-shielding layer also having plural light-transmitting portions corresponding to one of the pixel areas;

forming a storage capacitor electrode made of a conductive material;

forming an insulating layer covering the light-shielding layer and the storage capacitor electrode; and exposing the substrate from a side opposite to the side where the insulating layer is formed, wherein the light-shielding layer has a common signal line; and wherein the storage capacitor electrode overlaps the common signal line via an insulating layer interposed therebetween so as to form a storage capacitor.

6. A method for fabricating a reflective liquid crystal display device according to claim 5, wherein the storage capacitor electrode is a transparent electrode.

7. A reflective liquid crystal display device having a plurality of pixel areas comprising:
   a pair of transparent plates;
   a liquid crystal layer interposed between the pair of plates;
   a light-shielding layer provided on one of the plates, the light-shielding layer having a light-shielding portion, the light-shielding layer also having plural light-transmitting portions corresponding to one of the pixel areas;
   a storage capacitor electrode;
   an insulating layer covering the light-shielding layer and the storage capacitor electrode, the insulating layer having concave and convex surfaces; and
   a reflective pixel electrode provided on the concave and convex surfaces of the insulating layer,
   wherein the storage capacitor electrode is a transparent electrode.

8. A reflective liquid crystal display device according to claim 7, wherein the light-shielding layer has a common signal line; and
   wherein the storage capacitor electrode overlaps the common signal line via an insulating layer interposed therebetween so as to form a storage capacitor.

9. A reflective liquid crystal display device according to claim 7, further comprising:
   a plurality of pixel regions arranged in a matrix of N rows and M columns, where N and M are positive integers;
   a plurality of storage capacitor electrodes, each of which correspond to respective pixel region; and
   N gate signal lines, each of which correspond to a respective row of pixel regions,
   wherein a storage capacitor electrode in Ith row overlaps an (I+1)th or (I−1)th gate signal lines with an insulating layer interposed therebetween so as to form a storage capacitor, wherein I is an integer greater than 0 and less than or equal to N.

10. A reflective liquid crystal display device according to claim 9, wherein a part of the Ith gate signal line extends into a pixel region so as to overlap the storage capacitor electrodes in the (I+1)th or (I−1)th row with the insulating layer interposed therebetween.

11. A reflective liquid crystal display device according to claim 7, wherein the storage capacitor electrode has an opening at a position corresponding to the light-transmitting portion of the light-shielding layer.

12. A reflective liquid crystal display device according to claim 7, wherein a shape of the light-transmitting portion of the light-shielding layer is approximately round;
   a distance between two adjacent light-transmitting portions is in a range of about 3 to about 50 microns.

* * * * *